US008093553B2

(12) United States Patent
Green

(10) Patent No.: US 8,093,553 B2
(45) Date of Patent: Jan. 10, 2012

(54) MASS SPECTROMETER

(75) Inventor: Martin Green, Cheshire (GB)

(73) Assignee: Micromass UK Limited, Manchester (GB)

( * ) Notice: Subject to any disclaimer, the term of this patent is extended or adjusted under 35 U.S.C. 154(b) by 1200 days.

(21) Appl. No.: 10/914,547

(22) Filed: Aug. 9, 2004

(65) Prior Publication Data

US 2005/0061968 A1 Mar. 24, 2005

Related U.S. Application Data

(60) Provisional application No. 60/497,612, filed on Aug. 25, 2003.

(30) Foreign Application Priority Data

Aug. 18, 2003 (GB) .................................. 0319347.1

(51) Int. Cl.
*B01D 59/44* (2006.01)

(52) U.S. Cl. ......................... 250/287; 250/288; 250/292

(58) Field of Classification Search ................... 250/287
See application file for complete search history.

(56) References Cited

U.S. PATENT DOCUMENTS

| | | | | |
|---|---|---|---|---|
| 3,288,994 | A | 11/1966 | Omura et al. | |
| 3,784,821 | A * | 1/1974 | Jaszczak | 250/368 |
| 4,543,530 | A | 9/1985 | Kovach | |
| 5,689,111 | A * | 11/1997 | Dresch et al. | 250/287 |
| 6,747,271 | B2 * | 6/2004 | Gonin et al. | 250/281 |
| 6,781,121 | B1 * | 8/2004 | Davis et al. | 250/287 |
| 6,803,564 | B2 | 10/2004 | Kawato | |
| 6,870,156 | B2 | 3/2005 | Rather | |
| 2005/0006577 | A1 * | 1/2005 | Fuhrer et al. | 250/287 |

FOREIGN PATENT DOCUMENTS

| | | |
|---|---|---|
| DE | 1260198 | 2/1968 |
| DE | 2016224 | 4/1970 |
| DE | 10206173 | 9/2003 |
| EP | 1310982 | 5/2003 |
| GB | 2 379 027 | 2/2003 |
| JP | 2001283768 | 10/2001 |
| JP | 2002181790 | 6/2002 |
| JP | 2002260577 | 9/2002 |
| JP | 2003-151487 | 5/2003 |

OTHER PUBLICATIONS

Decision Of Rejection for Japanese Patent Application No. 2004-235319, dated Aug. 17, 2010.

* cited by examiner

*Primary Examiner* — Phillip A Johnston
(74) *Attorney, Agent, or Firm* — Diederiks & Whitelaw, PLC

(57) ABSTRACT

A method of determining the arrival time of one or more ions at an ion detector is disclosed. Ions arriving at the ion detector produce a signal and the time when a leading edge of the signal and when a trailing edge of the signal cross an intensity threshold are determined. The two times are then averaged to provide an ion arrival time.

32 Claims, 6 Drawing Sheets

MASS SPECTROMETER

CROSS REFERENCE RELATED APPLICATION INFORMATION

This application claims priority from United Kingdom Patent Application No. GB 0319347.1, filed 18 Aug. 2003 and U.S. Provisional Patent Application, Ser. No. 60/497,612, filed Aug. 25, 2003. The contents of these applications are incorporated herein by reference.

FIELD OF INVENTION

The present invention relates to a method of determining the arrival time of one or more ions at an ion detector, a mass spectrometer and a method of mass spectrometry.

BACKGROUND OF INVENTION

In a Time of Flight mass spectrometer bunches of ions are caused to enter a field free flight region with essentially the same kinetic energy. Ions with different mass to charge ratios will therefore travel with different velocities through the flight region and will reach a detector arranged at the end of the flight region at different times. The mass to charge ratios of the ions can then be determined by determining the transit times of the ions through the flight region.

Microchannel Plate ("MCP") detectors, discrete dynode electron multipliers or combinations of these devices are most commonly used as ion detectors in Time of Flight mass spectrometers. These detectors produce a bunch of electrons in response to an ion arriving at the ion detector. The electrons produced by the ion detector in response to an ion arrival are collected on one or more collection electrodes or anodes which are connected to a charge sensing discriminator. The signal produced by the charge sensing discriminator in response to electrons striking the collection electrode is commonly recorded using a multi stop Time to Digital Converter ("TDC") recorder. The clock of the TDC recorder is started as soon as a bunch of ions first enters the flight region of the Time of Flight mass spectrometer. Events recorded in response to the charge sensing discriminator output record the transit time of the ions through the flight region. A known 10 GHz TDC is able to record the arrival time of an ion at the ion detector to within ±100 ps.

In order to produce a complete mass spectrum, bunches of ions are repeatedly pulsed into the flight region. The transit times of all the ions through the flight region as recorded by the TDC recorder are used to produce a histogram of the number of ion arrivals as a function of the mass to charge ratio of the ions.

In a typical ion detector comprising a pair of microchannel plate detectors a bunch of electrons released from the microchannel plate detectors and incident upon a collection electrode arranged to receive the electrons will produce a signal input to a discriminator having an approximately Gaussian shape. Commonly such single ion peaks normally have a FWHM of between 0.5 and 3 ns. The average area of the ion peak will depend upon the gain of the ion detector. As will be appreciated by those skilled in the art, there will be a distribution of ion peak areas and thus ion peak intersites associated with the detection of ions using a microchannel plate detector even though the ions may have identical mass to charge ratios and velocities. This distribution arises due to the statistical nature of electron multiplication in the microchannel plate or other form of detector and the saturation characteristics of the multiplier. For a pair of microchannel plate detectors operated at a gain of approximately $10^7$ this Pulse Height Distribution ("PHD") is itself approximately Gaussian. The Pulse Height Distribution of a microchannel plate is generally described as the mean height of the signal as a percentage of the FWHM of the distribution of ion heights recorded. For this particular detector configuration a Pulse Height Distribution of 100-150% FWHM is common. If microchannel plate detectors are operated at low gain or discrete dynode electron multipliers or photo multipliers are used, then the Pulse Height Distribution has a different characteristic namely a negative exponential distribution. In any event it is apparent that there is a significant spread in ion signal intensities for single ion arrivals which must be somehow accommodated by the discriminator electronics.

Two main types of discriminators are commonly used in mass spectrometers. The simplest type of discriminator is a leading edge detector. The arrival time of an ion is recorded when the leading edge of an ion signal passes through or exceeds a predetermined intensity threshold. A count of 1 is then added to an histogram of intensity against flight time at the particular flight time associated with the ion signal crossing the intensity threshold. Digital electronics within the architecture of a multi stop Time to Digital Converter recorder are arranged to respond when the signal from the collection electrode (after amplification) exceeds that of the pre-set intensity threshold.

The other main type of discriminator is a Constant Fraction Discriminator ("CFD") or zero crossing (i.e. peak top) discriminator. The arrival time of an ion is recorded when the ion signal exceeds or reaches a predetermined percentage of the maximum height of the ion signal. In the particular case of a peak top discriminator this fraction is 100% of the maximum height of the ion signal. Zero crossing refers to the point at which the first differential of the ion signal crosses zero.

There are two main drawbacks to using digital leading edge detection discriminators. A first problem is that the Pulse Height Distribution associated with an ion detector leads to a time spread or jitter in the time recorded for ion arrivals. For example, a first ion arriving at the ion detector at a time T1 will produce an ion signal having a maximum height H1. Such an ion signal will pass through a pre-set intensity threshold at a time T1' and an event will be recorded in the closest corresponding time bin of the TDC. However, a second ion arriving at the ion detector at an identical time T1 may produce an ion signal which has a maximum height H2 which is greater than H1. Accordingly, such an ion signal will pass through the pre-set intensity threshold at a slightly earlier time T1". The event as recorded by the TDC will therefore be recorded in an earlier time bin of the TDC to that of the first ion. The magnitude of this time jitter is related to the gradient of the leading edge of the ion signal and the Pulse Height Distribution of the detector. This effect leads to a decrease in the mass resolution of the final histogram and hence of the mass analyser.

A second problem with using a leading edge detection discriminator is that the ion signal must also drop below the same pre-set intensity threshold before another ion can be detected i.e. before the leading edge of a second ion signal due to another ion arriving at the ion detector can be recorded. For single ion peak widths of 2.5 ns FWHM this can lead to a dead-time of up to 5 ns. This dead-time refers to the time after which an ion has arrived at the ion detector and is being recorded and during which time no further ion arrivals can be recorded.

Multi stop TDCs should ideally be operated such that the input signal remains above the pre-set intensity threshold for approximately two time bins for an event to be recorded. In addition, the signal should remain below the pre-set intensity threshold for two time bins before a second ion arrival event can be recorded. This requirement leads to an inherent dead-time associated with TDCs related to the speed of digitisation. The dead-time associated with a single ion peak width is generally larger that the inherent dead-time of a TDC itself when clock rates >1 GHz are used.

If two ions have identical mass to charge ratios and arrive at an ion detector from the same bunch of ions pulsed into the time of flight region and arrive at the ion detector during one dead-time period, then the arrival of the second ion will not be recorded. If the analyte signal is particularly intense then the number of ions having the same mass to charge ratio in the same ion bunch pulsed into the time of flight region may be correspondingly large with the result that a significant proportion of ions arriving at the ion detector will not be detected. The mass to charge ratio value measured in the final mass histogram will therefore be shifted to lower mass to charge ratio and the total number of ions recorded will be less than the true number of ions arriving at the ion detector. Furthermore, when more than one ion arrives at the ion detector separated in time by less than the FWHM of a single ion pulse, then the resulting ion signals will combine to produce an ion signal input to the discriminator which is generally larger than that for a single ion arrival. Using a fixed pre-set intensity threshold to determine ion arrival time will therefore lead to an additional systematic shift to lower recorded mass to charge ratio.

It is possible to address some of these problems using a Constant Fraction Discriminator set to record an ion arrival when the ion signal exceeds a certain percentage of the maximum peak height. This enables the jitter associated with the Pulse Height Distribution of the ion detector to be minimised. Similarly, the systematic shift to low mass to charge ratio associated with the heights of multiple ion arrivals will also be minimised.

Using a peak top discriminator (which is essentially a Constant Fraction Discriminator set to record an ion arrival when the ion signal is at 100% of the maximum height) enables the arrival time jitter and mass to charge ratio shift related to single or multiple ion peak heights also to be minimised. In addition, an improved measurement of the mean ion arrival time for overlapping multiple ion arrivals can be obtained. If two ions arrive at the ion detector from the same bunch of ions and produce ion signals having identical heights and areas, then if the individual ion signals are separated in time by less than the FWHM of a single ion peak, then the two ion signals will combine to produce a resultant ion signal having twice the area of an individual ion signal. Although a peak top discriminator should in theory determine the mean arrival time of the two ions, in reality because the heights and thus areas of the two ion signals are unlikely to be exactly identical, then the peak top measurement for multiple ion arrivals will be subject to some statistical variation. This variation will though tend to be averaged in the final histogram. However, although Constant Fraction Discriminators and peak top discriminators have certain advantages compared to leading edge detectors, they also suffer from dead-time problems. In general there is a period of about 5-10 ns after an ion arrival is recorded during which no further ions arrivals can be recorded. In the case of a Constant Fraction Discriminator this leads to a systematic shift in the mass to charge ratio recorded in the final histogram. This shift will though not be quite as pronounced as the equivalent situation using a fixed pre-set intensity threshold leading edge detection discriminator.

In the case of a peak top discriminator, a systematic shift to low mass to charge ratio is only evident when the spread of ion arrivals in the final histogrammed peak (equivalent to the mass resolution of the instrument) exceeds a certain value. For illustration, if two ions arrive from the same ion bunch separated in time by more than the FWHM of a single ion peak, then the resultant ion signal will have two local maxima. Using a peak top discriminator only the first maxima will be recorded if the second maxima falls within the dead-time of the first (which is often the case). This again leads to a systematic shift to lower mass to charge ratio in the final histogram.

In all cases only one event may be recorded during one dead-time period. When significant numbers of ions arrive at substantially the same time the number of ion arrivals recorded in the final histogram will be less than the total number of ions actually arriving at the ion detector.

For these types of ion counting systems it is known to attempt to correct the mass to charge ratios and ion signal intensities reported in the final mass histogram using a method of dead-time correction. Dead-time correction may, for example, be applied to the ion count in each time bin of the final mass histogram or dead-time correction may be applied to individual mass spectral peaks based upon a predetermined look-up table. Further discussion of dead-time correction techniques is given in WO 98/21742 (U.S. Pat. No. 6,373,052) Hoyes, et al. The latter method allows real time correction of mass spectra and allows data from detailed Monte-Carlo modelling of the characteristics of individual discriminators and detector Pulse Height Distributions and output peak widths and shapes to be accommodated.

Dead-time correction, however, cannot accurately be applied when the ion signal intensity is changing dynamically during the time taken to accumulate complete mass spectra. If the ion intensity is changing in a known way this can be incorporated to some extent into the dead-time model. However, in reality, the ion intensity tends to change in an unpredictable manner and hence the average amount of correction to be applied can only be approximated by examining the rate of change from mass spectra to mass spectra as the experiment proceeds. For example, as analyte elutes from a chromatographic inlet its intensity will be changing during the time frame of a single histogram. Similarly, for systems using RF multipole rod set ion guides as ion-transfer devices, the transmission characteristics of the ion guide may vary during the time necessary to accumulate a histogram. This allows a broad cross section of ions having different mass to charge ratio values to be transmitted. The intensity of individual mass to charge ratio values within this histogram period will be changing at different rates during this procedure. Complex models are required in order to attempt to accommodate these changes to allow the amount of dead-time correction to be approximated. This can lead both to mass and intensity errors. The accuracy and precision required for dead time correction of mass to charge ratio value is often in the order of ±1-5 ppm. However, for quantitative work the accuracy and precision for intensity correction is generally of the order of ±5-10%. It can be seen therefore that relatively crude approximate models for dead time correction may suffice for intensity correction but lead to unacceptable errors in mass measurement.

It is therefore desired to provide an improved ion detection system and method of determining the ion arrival time at an ion detector.

SUMMARY OF INVENTION

According to an aspect of the present invention there is provided an ion detector for a mass spectrometer comprising:

a detector which generates, in use, a signal in response to one or more ions arriving at the detector;

means for determining a first time when a leading, rising, first or initial edge of the signal crosses or exceeds a first threshold or level;

means for determining a second time when a trailing, falling, second or subsequent edge of the signal crosses or falls below a second threshold or level; and means for combining or averaging the first and second times to provide an ion arrival time.

According to the preferred embodiment the signal in response to one or more ions arriving at the ion detector initially increases from a baseline value (i.e. zero), peaks and then decreases back to the baseline value. However, according to another embodiment the signal may be inverted i.e. the signal initially decreases from a baseline value, reaches a trough and then increases back to the baseline value. Both embodiments are intended to fall within the scope of the independent claims.

The detector preferably comprises a channel electron multiplier such as one or more microchannel plates. According to the preferred embodiment at least two microchannel plates are arranged to form at least one chevron pair of microchannel plates. Ions are received at an input surface of the one or more microchannel plates and electrons are released from an output surface of the one or more microchannel plates.

The detector preferably further comprises one or more collection electrodes or anodes arranged to receive in use at least some of the electrons released from the one or more microchannel plates.

According to another embodiment the detector may comprise one or more discrete dynode electron multipliers, or a scintillator or phosphorous screen (preferably in combination with a photo-multiplier).

The first threshold or level and/or the second threshold or level preferably comprise an intensity threshold or level. According to the preferred embodiment the first threshold or level is substantially the same as the second threshold or level. However, according to a less preferred embodiment the first threshold or level may be substantially different to (i.e. greater or smaller than) the second threshold or level.

The ion detector preferably comprises means for associating a leading, rising, first or initial edge of the signal with the closest detected trailing, falling, second or subsequent edge.

If the ion signal comprises multiple leading, rising, first or initial edges and/or multiple trailing, falling, second or subsequent edges then a leading, rising, first or initial edge is associated with the trailing, falling, second or subsequent edge which is closest in time to the particular leading, rising, first or initial edge.

The ion detector preferably comprises a first Time to Digital Converter for determining the first time and/or the second time. Optionally, a second Time to Digital Converter may be provided for determining the first time and/or the second time. The first Time to Digital Converter and/or the second Time to Digital Converter may be arranged to use leading edge discrimination to determine the first time and/or the second time. Alternatively, the first Time to Digital Converter and/or the second Time to Digital Converter may be arranged to use constant fraction discrimination to determine the first time and/or the second time.

According to a less preferred embodiment the ion detector may comprise a first Analogue to Digital Converter for determining the first time and/or the second time. Optionally, a second Analogue to Digital Converter may be provided for determining the first time and/or the second time.

According to an aspect of the present invention there is provided a mass spectrometer comprising an ion detector as described above.

The mass spectrometer preferably comprises a Time of Flight mass spectrometer, but according to less preferred embodiments the mass spectrometer may comprise a quadrupole mass analyser, a Penning mass analyser, a Fourier Transform Ion Cyclotron Resonance ("FTICR") mass analyser, a 2D or linear quadrupole ion trap, a Paul or 3D quadrupole ion trap or a magnetic sector mass analyser.

The mass spectrometer preferably further comprises an ion source selected from the group consisting of: (i) an Electrospray Ionisation ("ESI") ion source; (ii) an Atmospheric Pressure Ionisation ("API") ion source; (iii) an Atmospheric Pressure Chemical Ionisation ("APCI") ion source; (iv) an Atmospheric Pressure Photo Ionisation ("APPI") ion source; (v) a Laser Desorption Ionisation ("LDI") ion source; (vi) an Inductively Coupled Plasma ("ICP") ion source; (vii) a Fast Atom Bombardment ("FAB") ion source; (viii) a Liquid Secondary Ion Mass Spectrometry ("LSIMS") ion source; (ix) a Field Ionisation ("FI") ion source; (x) a Field Desorption ("FD") ion source; (xi) an Electron Impact ("EI") ion source; (xii) a Chemical Ionisation ("CI") ion source; (xiii) a Matrix Assisted Laser Desorption Ionisation ("MALDI") ion source; and (xiv) a Desorption Ionisation on Silicon ("DIOS") ion source.

The ion source may be either continuous or pulsed.

According to another aspect of the present invention there is provided an ion detector for a mass spectrometer comprising:

a detector which generates, in use, a signal in response to one or more ions arriving at the detector;

means for determining a first time when a leading, rising, first or initial edge of the signal crosses or exceeds a first threshold or level;

means for determining a second time when a trailing, falling, second or subsequent edge of the signal crosses or falls below a second threshold or level; and means for averaging the signal intensity between the first and second times to provide an ion arrival time.

The means for averaging the signal intensity between the first and second times preferably determines a weighted average ion arrival time. Preferably, the means for averaging the signal intensity between the first and second times determines a weighted average ion arrival time within time bins bounded by the first time and the second time. Further preferably, the means for averaging the signal intensity between the first and second times determines the sum of all the intensities of at least 50%, 60%, 70%, 80%, 90%, 95% or 100% of the time bins bounded by the first time and the second time.

The ion detector may comprise a first Analogue to Digital Converter for determining the first time and/or the second time. Optionally, a second Analogue to Digital Converter may be provided for determining the first time and/or the second time.

According to another aspect of the present invention there is provided a method of determining the arrival time of one or more ions at a detector comprising:

generating a signal in response to one or more ions arriving at the detector;

determining a first time when a leading, rising, first or initial edge of the signal crosses or exceeds a first threshold or level;

determining a second time when a trailing, falling, second or subsequent edge of the signal crosses or falls below a second threshold or level; and combining or averaging the first and second times to provide an ion arrival time.

According to another aspect of the present invention there is provided a method of determining the arrival time of one or more ions at a detector comprising:

generating a signal in response to one or more ions arriving at the detector;

determining a first time when a leading, rising, first or initial edge of the signal crosses or exceeds a first threshold or level;

determining a second time when a trailing, falling, second or subsequent edge of the signal crosses or falls below a second threshold or level; and averaging the signal intensity between the first and second times to provide an ion arrival time.

The preferred embodiment relates to a method for detecting ions arriving at an ion detector in single Time of Flight mass spectra which minimises the effect of dead-time on the mass to charge ratio measurement accuracy. According to the preferred embodiment, detection of single or multiple ion arrival times during a single Time of Flight experiment is achieved by recording the times at which both the leading and the trailing (falling) edge of an ion signal produced by a collection electrode crosses a predetermined discriminator intensity threshold. Using the times recorded for both the leading and the trailing edge of the ion signal to calculate an average ion arrival time allows a more accurate determination of the mean arrival time especially when multiple ions arrive at the ion detector at substantially the same time. The preferred method of ion arrival detection and determination results in a mass measurement accuracy of the final histogrammed peak which is independent of dead-time effects. With no dead-time correction required for mass to charge ratio measurement at high count rates, error due to dynamically changing signals within an individual histogram is effectively removed.

Various embodiments of the present invention will now be described, by way of example only, and with reference to the accompanying drawings in which:

FIG. 1A illustrates using leading edge detection to determine an ion arrival,

FIG. 1B illustrates how using leading edge detection results in a different recorded arrival time for an ion having the same mean flight time as in the example shown in FIG. 1A but wherein the ion detector produces a less intense ion signal in response to an ion arrival, FIG. 1C illustrates using leading edge detection to determine an average ion arrival time when two ions arrive at similar times and FIG. 1D illustrates using leading edge detection to determine an average ion arrival time when two ions arrive at slightly delayed times;

FIG. 2A illustrates using a constant fraction discriminator to determine an ion arrival, FIG. 2B illustrates how a constant fraction discriminator correctly records the same flight time irrespective of the intensity of the ion signal produced by the ion detector in response to an ion arrival, FIG. 2C illustrates using a constant fraction discriminator to determine an average ion arrival time when two ions arrive at similar times and FIG. 2D illustrates using a constant fraction discriminator to determine an average ion arrival time when two ions arrive at slightly delayed times;

FIG. 3A illustrates using peak top detection to determine an ion arrival,

FIG. 3B illustrates how a peak top detector correctly records the same flight time irrespective of the intensity of the ion signal produced by the ion detector in response to an ion arrival, FIG. 3C illustrates how a peak top detector correctly determines an average ion arrival time when two ions arrive at similar times and FIG. 3D illustrates how a peak top detector fails to correctly determine an average ion arrival time when two ions arrive at slightly delayed times;

FIG. 4A illustrates a preferred method of determining an ion arrival time wherein the times at which the leading and trailing edges of an ion signal cross an intensity threshold are detected and the times averaged, FIG. 4B illustrates how the preferred method of determining an ion arrival time records the same flight time irrespective of the intensity of the ion signal produced by the ion detector in response to an ion arrival, FIG. 4C illustrates how the preferred method of determining an ion arrival time correctly determines an average ion arrival time when two ions arrive at similar times and FIG. 4D illustrates how the preferred method of determining an ion arrival time correctly determines an average ion arrival time when two ions arrive at slightly delayed times;

Figure 7:
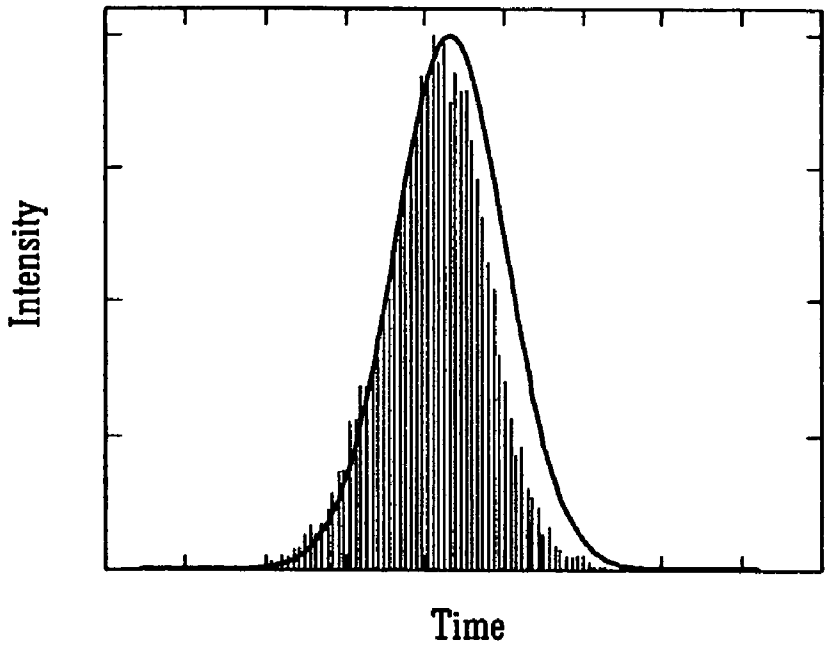
Figure 8:
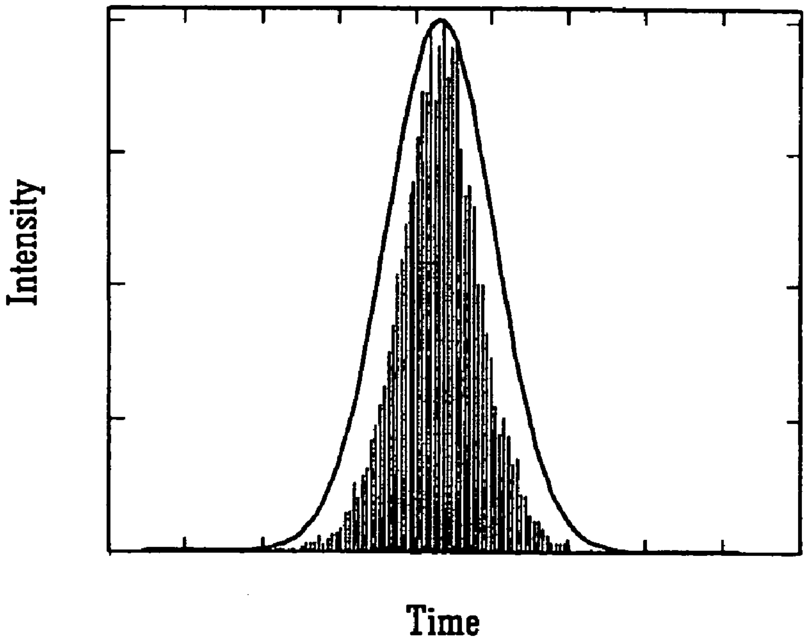

FIG. 7 illustrates the difference between an actual measured ion signal and a theoretical ion signal for a simulation wherein the ion detector system uses a peak top discriminator to determine ion arrival times; and FIG. 8 illustrates the difference between an actual measured ion signal and a theoretical ion signal for a simulation wherein the ion detector system uses a method of determining ion arrival times according to the preferred embodiment of the present invention.

In order to understand the various differences between conventional techniques of determining the arrival time of an ion and the preferred method of determining the arrival time of an ion, a number of different conventional approaches will first be described with reference to FIGS. 1-3. FIGS. 1A-1D illustrate determining ion arrival time using simple leading edge detection, FIGS. 2A-2D illustrate determining ion arrival time using leading edge detection with a constant fraction discriminator and FIGS. 3A-3D illustrate determining ion arrival time using peak top detection. These different approaches to determining the ion arrival time will now be discussed in more detail.

Figure 1A:
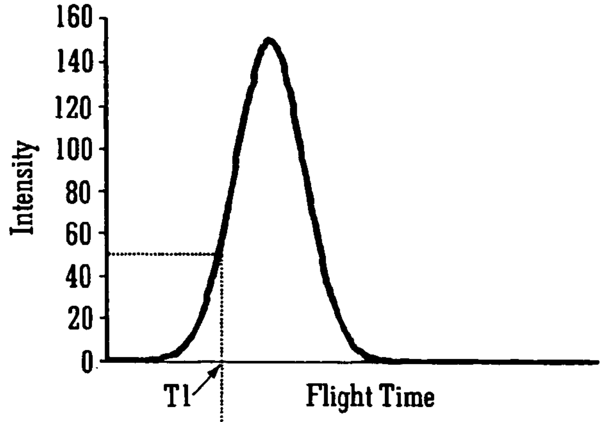

FIG. 1A illustrates the ion signal recorded by a collection electrode of an ion detector for a single ion arriving at the ion detector and illustrates how the ion arrival time may be determined using simple leading edge detection. An ion arrival time T1 is recorded by a leading edge discriminator which is set to detect and record an ion arrival when the detected ion signal intensity exceeds a pre-set intensity threshold. In the particular example shown in FIG. 1A the pre-set intensity threshold is set at 50.

Figure 1B:
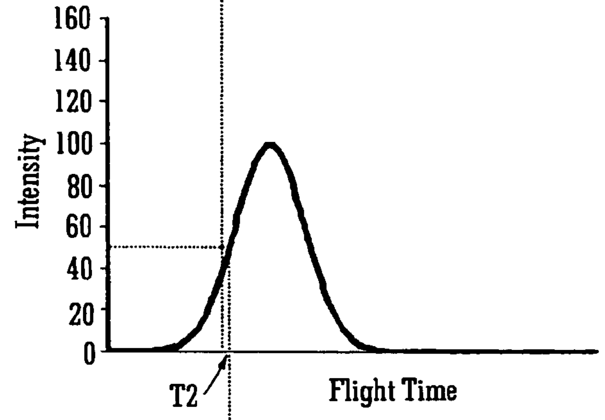

FIG. 1B illustrates the ion signal recorded by the collection electrode of an ion detector for a single ion arriving at the ion detector when the ion arrives at the ion detector at the same time as the ion in the example shown in FIG. 1A but wherein the resulting ion signal produced by the ion detector has a lower intensity than that of the ion signal shown in FIG. 1A. The lower intensity ion signal may be due to the Pulse Height Distribution of the ion detector. Although the mean arrival time of the ion in the example illustrated by FIG. 1B is identical to the example illustrated by FIG. 1A, it is apparent that when using leading edge detection with a constant pre-set intensity threshold, the recorded ion arrival time T2 when the ion signal is less intense differs from the recorded ion arrival time T1 when the ion signal is more intense.

The two different recorded ion arrival times T1,T2 as recorded using a leading edge discriminator result from setting the discriminator to detect an ion arrival when the ion signal intensity exceeds the same pre-set intensity threshold. The difference in the two recorded ion arrival times T1,T2 for two ions which have the same mean arrival time illustrates the time jitter associated with using a simple leading edge discriminator. The time jitter is mainly due to the Pulse Height Distribution of the ion detector.

Figure 1C:
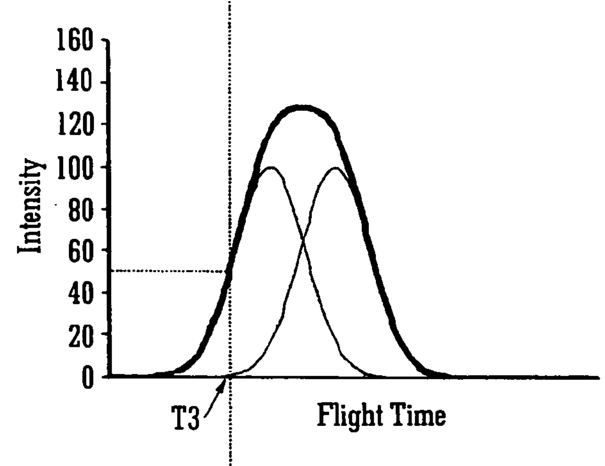

FIG. 1C illustrates the resultant ion signal recorded by a collection electrode of an ion detector using simple leading edge detection when two ions arrive at the ion detector at similar times and the individual ion signals are separated in time by less than the FWHM of a single ion signal. An ion arrival time T3 is recorded by a leading edge discriminator set to detect and record an ion arrival when the detected ion signal intensity exceeds a pre-set intensity threshold. In the particular example shown in FIG. 1C the pre-set intensity threshold is set at 50. Whilst the mean arrival time of the two ion signals has moved appreciably to a higher flight time compared to the ion arrival time shown in the examples in FIGS. 1A and 1B, the ion arrival time T3 as actually recorded by the leading edge discriminator does not reflect any such shift. When the probability of multiple ion arrivals at substantially similar times is significant, this effect leads to a systematic shift to lower flight time in the final histogrammed mass spectra.

Figure 1D:
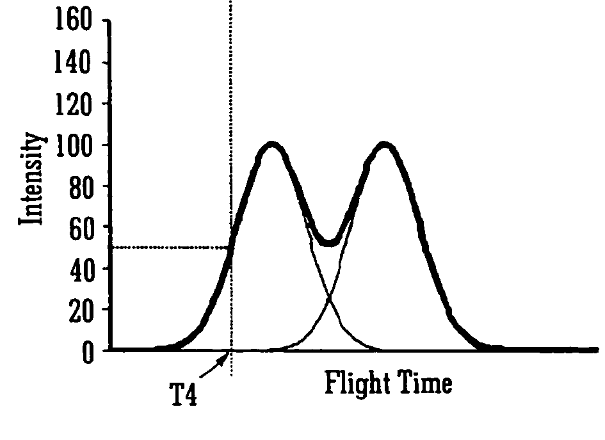
FIG. 1D PRIOR ART

FIG. 1D illustrates the resultant ion signal recorded by a collection electrode of an ion detector using simple leading edge detection when two ions arrive at the ion detector at slightly different times and the individual ion signals are separated in time by more than the FWHM of a single ion signal. An ion arrival time T4 is recorded by a leading edge discriminator set to detect and record an ion arrival when the detected ion signal intensity exceeds a pre-set intensity threshold. In the particular example shown in FIG. 1D the pre-set intensity threshold is set at 50. Whilst the mean arrival time of the two ion signals has moved even more appreciably to a higher flight time compared to the ion arrival time shown in the examples in FIGS. 1A, 1B and 1C, the ion arrival time T4 as actually recorded by the leading edge discriminator again does not reflect any such shift. When the probability of multiple ion arrivals at slightly different times is significant, this effect leads to a systematic significant shift to lower flight time in the final histogrammed mass spectra.

Figure 2A:
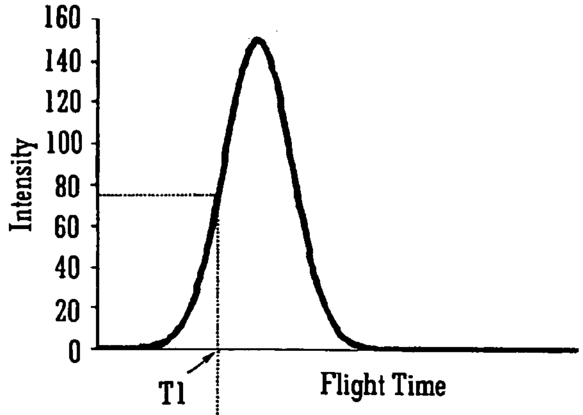

FIG. 2A illustrates the ion signal recorded by a collection electrode of an ion detector for a single ion arriving at the ion detector and illustrates how the ion arrival time may be determined using a constant fraction discriminator. An ion arrival time T1 is recorded by a constant fraction discriminator which is set to detect and record an ion arrival when the detected ion signal intensity exceeds an intensity threshold which is set, in this particular example, at 50% of the maximum height of the peak.

Figure 2B:
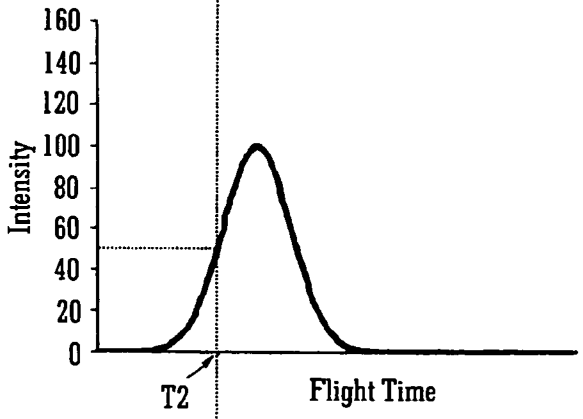

FIG. 2B illustrates the ion signal recorded by the collection electrode of an ion detector for a single ion arriving at the ion detector when the ion arrives at the ion detector at the same time as the ion in the example shown in FIG. 2A but wherein the resulting ion signal produced by the ion detector has a lower intensity than that of the ion signal shown in FIG. 2A. The lower intensity ion signal may be due to the Pulse Height Distribution of the ion detector. Ion arrival time T2 indicates the arrival time recorded by the constant fraction discriminator which is set to detect and record an ion arrival when the detected ion signal intensity exceeds an intensity threshold which is set, in this particular example, at 50% of the maximum height of the peak. In this case it can be seen that the ion arrival time T2 as recorded by the constant fraction discriminator is identical to the ion arrival time T1 as recorded by the constant fraction discriminator in the example shown in FIG. 2A. This illustrates the ability of a constant fraction discriminator to minimise arrival time jitter associated with the Pulse Height Distribution of the ion detector which is problematic when using simple leading edge detection.

Figure 2C:
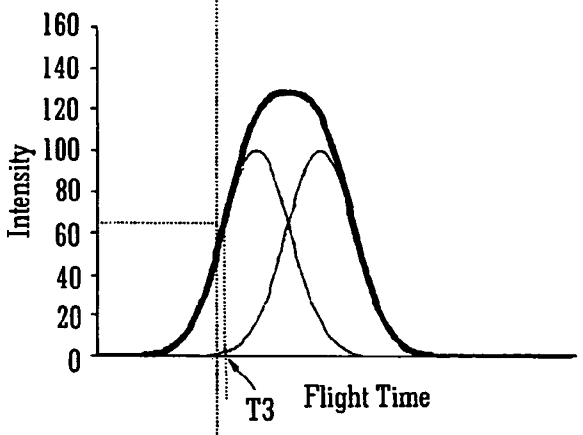

FIG. 2C illustrates the resultant ion signal recorded by a collection electrode of an ion detector using a constant fraction discriminator when two ions arrive at the ion detector at similar times and the individual ion signals are separated in time by less than the FWHM of a single ion signal. An ion arrival time T3 is recorded by using a constant fraction discriminator set to detect an ion arrival when the detected ion signal intensity exceeds an intensity threshold which is set, in this particular example, at 50% of the maximum height of the peak. Whilst the mean arrival time of the two ion signals has moved appreciably to a higher flight time compared to the ion arrival time shown in the examples in FIGS. 2A and 2B, the ion arrival time T3 as actually recorded by the constant fraction discriminator does not fully reflect the magnitude of this shift. When the probability of multiple ion arrivals at substantially similar times is significant, this effect leads to a systematic shift to lower flight time in the final histogrammed mass spectra.

Figure 2D:
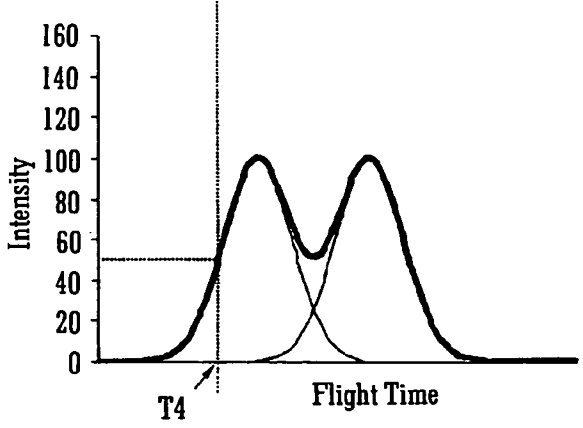
FIG. 2D PRIOR ART

FIG. 2D illustrates the resultant ion signal recorded by a collection electrode of an ion detector using a constant fraction discriminator when two ions arrive at the ion detector at slightly different times and the individual ion signals are separated in time by more than the FWHM of a single ion signal. An ion arrival time T4 is recorded by a constant fraction discriminator set to detect and record an ion arrival when the detected ion signal intensity exceeds an intensity threshold which, in this particular example, is set at 50% of the maximum height of the peak. Whilst the mean arrival time of the two ion signals has moved even more appreciably to a higher flight time compared to the ion arrival time shown in the examples in FIGS. 2A, 2B and 2C, the ion arrival time T4 as actually recorded by the constant fraction discriminator does not reflect any such shift. When the probability of multiple ion arrivals at slightly different times is significant, this effect leads to a systematic shift to lower flight time in the final histogrammed mass spectra.

Figure 3A:
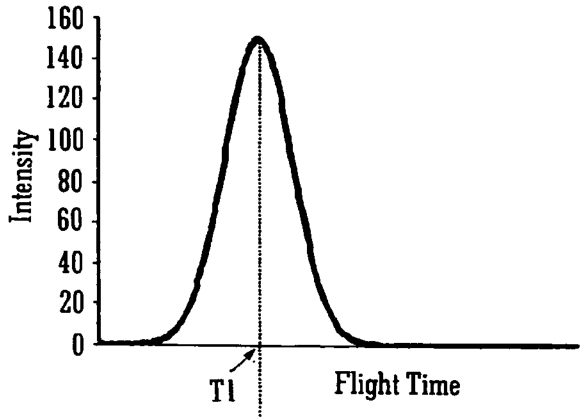

FIG. 3A illustrates the ion signal recorded by a collection electrode of an ion detector for a single ion arriving at the ion detector and illustrates how the ion arrival time may be determined using a peak top discriminator. An ion arrival time T1 is recorded by a peak top discriminator when the detected ion signal intensity reaches the maximum height of the peak.

Figure 3B:
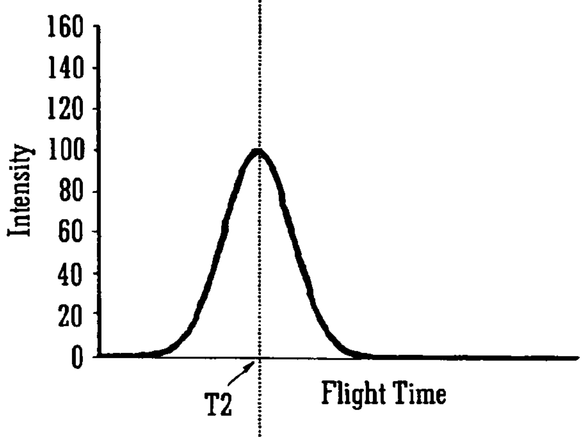

FIG. 3B illustrates the ion signal recorded by the collection electrode of an ion detector for a single ion arriving at the ion detector when the ion arrives at the ion detector at the same time as the ion in the example shown in FIG. 3A but wherein the resulting ion signal produced by the ion detector has a lower intensity than that of the ion signal shown in FIG. 3A. The lower intensity ion signal may be due to the Pulse Height Distribution of the ion detector. Ion arrival time T2 indicates the arrival time recorded by a peak top discriminator when the detected ion signal intensity reaches the maximum of the peak. In this case it can be seen that the ion arrival time T2 as recorded by the peak top discriminator is identical to the ion arrival time T1 as recorded by the peak top discriminator in the example shown in FIG. 3A. This illustrates the ability of a peak top discriminator to minimise arrival time jitter associated with the Pulse Height Distribution of the ion detector which is problematic when using simple leading edge detection.

Figure 3C:
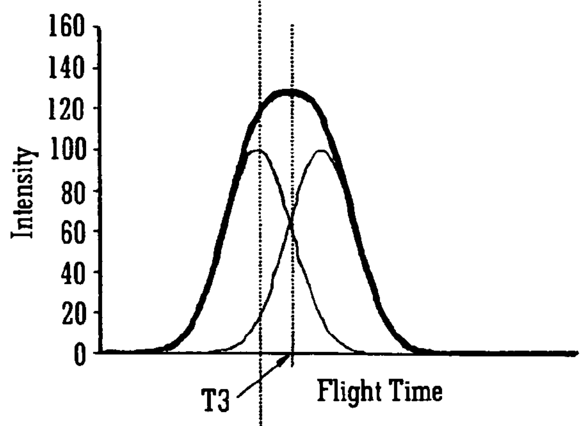

FIG. 3C illustrates the resultant ion signal recorded by a collection electrode of an ion detector using a peak top discriminator when two ions arrive at the ion detector at similar times and the individual ion signals are separated in time by less than the FWHM of a single ion signal. An ion arrival time T3 is recorded using a peak top discriminator set to detect an ion arrival when the detected ion signal intensity reaches the maximum height of the peak. The mean arrival time of the two ion signals has moved appreciably to higher flight time and the peak top discriminator has correctly recorded the shift in arrival time.

Figure 3D:
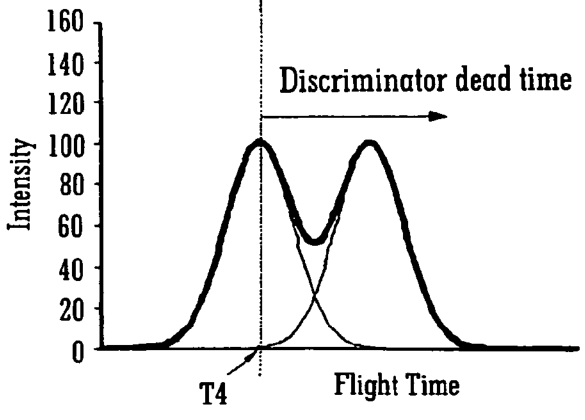
FIG. 3D PRIOR ART

FIG. 3D illustrates the resultant ion signal recorded by a collection electrode of an ion detector using a peak top discriminator when two ions arrive at the ion detector at slightly different times and the individual ion signals are separated in time by more than the FWHM of a single ion signal. An ion arrival time T4 is recorded by a peak top discriminator set to detect an ion arrival when the detected ion signal intensity reaches the maximum height of the peak. Whilst the mean arrival time of the two ion signals has moved even more appreciably to higher flight time compared to the ion arrival time shown in the examples in FIGS. 3A, 3B and 3C, the ion arrival time T4 as actually recorded by the peak top discriminator does not reflect any such shift. Only the time for the first apex of the combined ion signal is recorded as the second apex falls within the dead-time of the discriminator. When the probability of multiple ion arrivals within this dead-time is significant, this effect leads to a systematic shift to lower flight time in the final histogrammed mass spectra.

The preferred method of determining the arrival time of one or more ions at an ion detector will now be described. In particular, the preferred approach is to detect when both the leading and trailing edges of an ion signal cross an intensity threshold and then to combine and preferably average these two times.

Figure 4A:
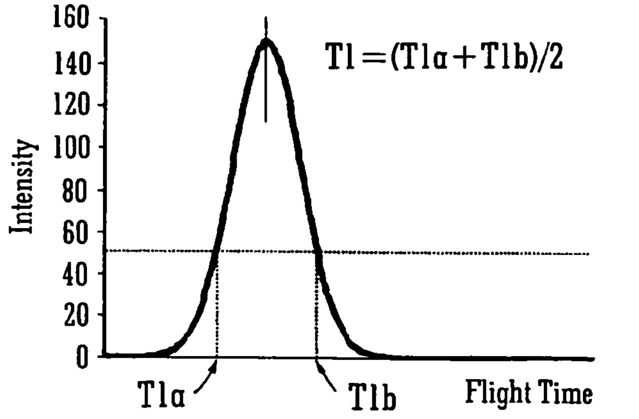

FIG. 4A illustrates the ion signal recorded by a collection electrode of an ion detector for a single ion arriving at the ion detector and illustrates how the ion arrival time is recorded according to the preferred method of ion detection. An ion arrival time T1 is recorded according to the preferred embodiment by determining the times T1*a*,T1*b* at which the leading and trailing edges of the ion signal cross a predetermined intensity threshold. The ion arrival time T1 as recorded according to the preferred embodiment is preferably the average or mean of these two times T1*a*,T1*b*.

Figure 4B:
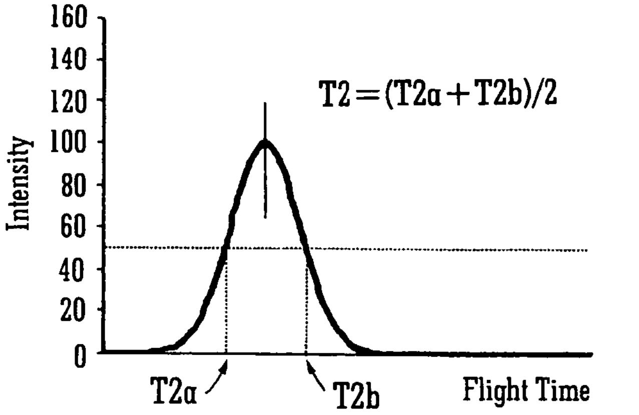

FIG. 4B illustrates the ion signal recorded by a collection electrode of an ion detector for a single ion arriving at the ion detector when the ion arrives at the ion detector at the same time as the ion in the example shown in FIG. 4A but wherein the resulting ion signal produced by the ion detector has a lower intensity than that of the ion signal shown in FIG. 4A. The lower intensity ion signal may be due to the Pulse Height Distribution of the ion detector. Ion arrival time T2 indicates the arrival time as recorded according to the preferred embodiment by averaging the times T2*a*,T2*b* at which the leading and trailing edges of the ion signal cross a predetermined intensity threshold. In this case it can be seen that the ion arrival time T2 as recorded according to the preferred embodiment is identical to the ion arrival time T1 as recorded in the example shown in FIG. 4A. This illustrates the ability of the preferred embodiment to minimise arrival time jitter associated with the Pulsed Height Distribution of the ion detector which is problematic when using simple leading edge detection.

Figure 4C:
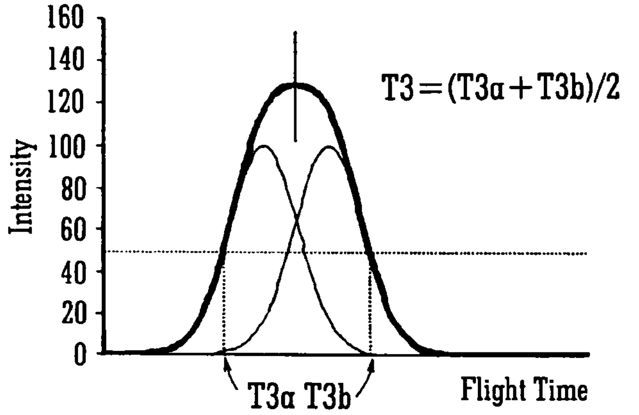

FIG. 4C illustrates the resultant ion signal recorded by a collection electrode of an ion detector using the preferred method of ion detection when two ions arrive at the ion detector at similar times and the individual ion signals are separated in time by less than the FWHM of a single ion signal. An ion arrival time T3 is recorded according to the preferred embodiment by averaging the times T3*a*,T3*b* at which the leading and trailing edges of the ion signal cross a predetermined intensity threshold. The mean arrival time of the combined ion signals has moved appreciably to higher flight time and the preferred method of ion detection has correctly recorded the shift in arrival time.

Figure 4D:
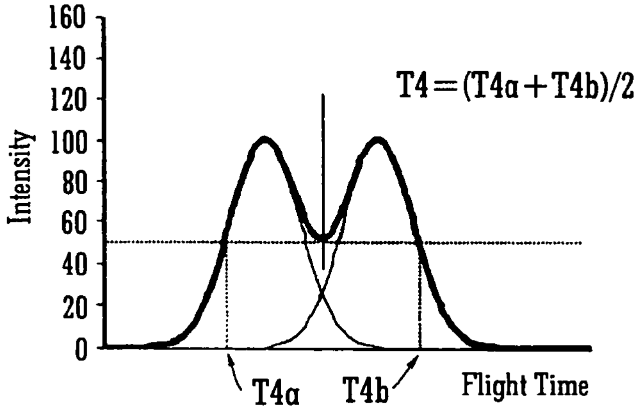

FIG. 4D illustrates the resultant ion signal recorded by a collection electrode of an ion detector using the preferred method of ion detection when two ions arrive at the ion detector at slightly different times and the individual ions are separated in time by more than the FWHM of a single ion signal. An ion arrival time T4 is recorded according to the preferred embodiment by averaging the times T4*a*,T4*b* at which the leading and trailing edges of the ion signal cross a predetermined intensity threshold. The mean arrival time of the combined ion signals has moved appreciably to a higher flight time and the preferred method of ion detection has importantly correctly recorded the shift in arrival time. The resultant histogrammed mass spectra will therefore show no adverse shift in flight time due to dead-time effects. The preferred method of ion detection therefore represents an important advance in the art and enables a significantly improved ion detection system to be provided.

A Monte Carlo model representing the histogram generated for a mass spectral peak having a mass to charge ratio of 800 and a resolution of 5000 (FWHM) corresponding to a peak width at half height of 200 ppm was run in order to further illustrate the different methods of determining an ion arrival time. The model consisted of a signal generated from 10,000 bunches of ions having a mean number of two ions per bunch. Considering a Poisson distribution of ions within each of the 10,000 bunches of ions, the number of single and multiple ion arrivals was determined to be: 2707 single ion arrivals, 2707 double ion arrivals, 1804 triple ion arrivals, 902 quadruple ion arrivals, 361 quintuple ion arrivals, 120 sextuple ion arrivals, 34 septuple ion arrivals and 9 octuple ion arrivals. A total of 19976 ions were simulated and the total number of separate single and multiple ion events recorded was 8644. The difference between the number of events actually recorded (8644) and the actual number of ions simulated (19976) was due to dead-time effects as previously described. Knowing the average number of ions per bunch enabled the recorded intensity to be partially corrected using known methods of dead-time correction.

For the purposes of the simulation each ion was generated with a FWHM of 2 ns and a random Gaussian distribution of heights equivalent to a Pulsed Height Distribution of 150%. The arrival time of each ion was also generated from a Gaussian distribution with a mean arrival time of 33.1 ns and a FWHM of 3.31 ns.

Ion arrival detection using conventional simple leading edge detection, leading edge detection using a constant fraction discriminator, and peak top detection were simulated. The preferred method of detection based upon the detection and averaging of the times that the leading and trailing edges of the ion signal crossed an intensity threshold was also simulated.

Figure 5:
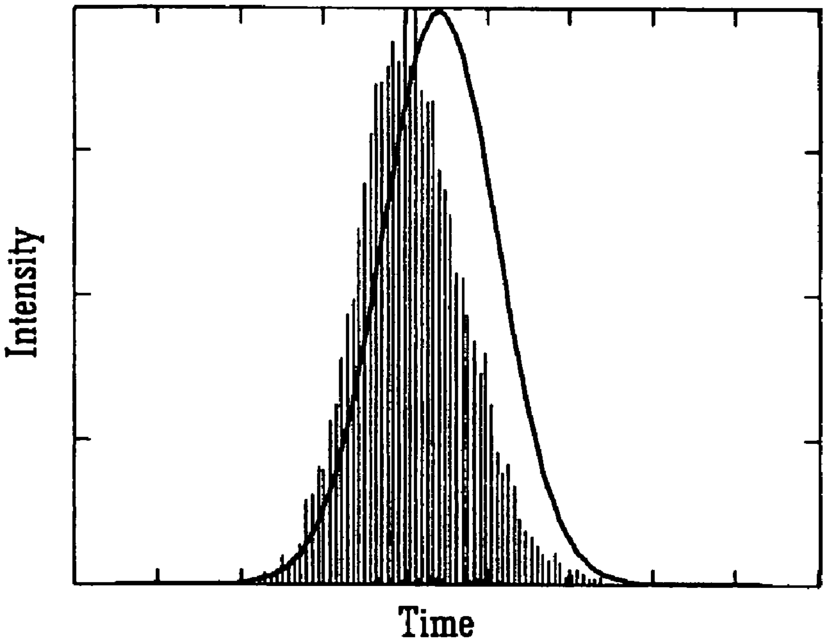
FIG. 5 illustrates the difference between an actual measured ion signal and a theoretical ion signal for a simulation wherein the ion detector system uses leading edge detection to determine ion arrival times.

FIG. 5 shows the results of the simulation using simple leading edge detection with a fixed pre-set intensity threshold. Data generated by the simulation is shown as a histogram and the solid line shows the expected (theoretical) peak envelope if no distortion due to dead-time effects occurred. The height of the undistorted peak envelope has been normalised to the highest intensity in the histogram generated by the simulation. The measured ppm shift in mass to charge ratio for the experimental data away from the expected measurement was determined to be −44.5 ppm. The estimated standard deviation error for this measurement was determined to be ±0.85 ppm.

Figure 6:
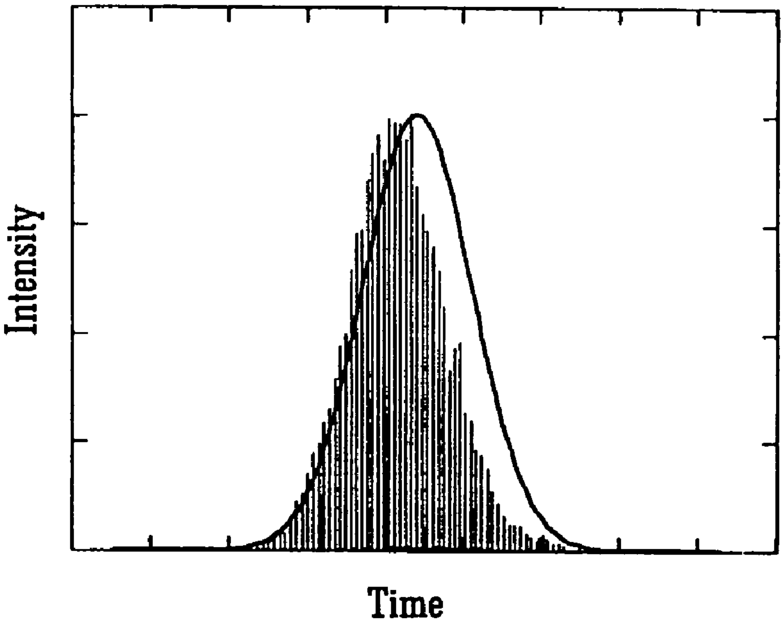
FIG. 6 illustrates the difference between an actual measured ion signal and a theoretical ion signal for a simulation wherein the ion detector system uses a constant fraction discriminator to determine ion arrival times.

FIG. 6 shows the results of the simulation using a constant fraction discriminator with an intensity threshold set at 10% of the height of the combined signal. Data generated by the simulation is shown as a histogram and the solid line shows the expected (theoretical) peak envelope if no distortion due to dead-time effects occurred. The height of the undistorted peak envelope has been normalised to the highest intensity in the histogram generated by the simulation. The measured ppm shift in mass to charge ratio for the experimental data away from the expected measurement was determined to be −33.2 ppm. The estimated standard deviation error for this measurement was determined to be ±0.85 ppm.

FIG. 7 shows the results of the simulation using a peak top discriminator. Data generated by the simulation is shown as a histogram and the solid line shows the expected (theoretical) peak envelope if no distortion due to dead-time effects occurred. The height of the undistorted peak envelope has been normalised to the highest intensity in the histogram generated by the simulation. The measured ppm shift in mass to charge ratio for the experimental data away from the expected measurement was determined to be −22.3 ppm. The estimated standard deviation error for this measurement was determined to be ±0.85 ppm.

FIG. 8 shows the results of the simulation using the preferred method of determining ion arrival. Data generated by the simulation is shown as a histogram and the solid line shows the expected (theoretical) peak envelope if no distortion due to dead-time effects occurred. The height of the undistorted peak envelope has been normalised to the highest intensity in the histogram generated by the simulation. The measured ppm shift in mass to charge ratio for the experimental data away from the expected measurement was determined to be −0.68 ppm (i.e. negligible). The estimated standard deviation error for this measurement was determined to be ±0.85 ppm.

In the preferred embodiment the digital electronics within a multi stop TDC are preferably used to record the times at which the leading and trailing edge of the signal produced by a collection electrode (due to either a single ion arrival or to multiple ion arrivals) passes through a pre-set intensity threshold. The TDC may use either leading edge or constant fraction discrimination to record the times at which the leading and trailing edges exceed a certain threshold. A single time of flight spectra recorded by the TDC will consist of pairs of leading and trailing edge times. A detected leading edge is preferably associated with the nearest detected trailing edge. The times recorded may be flagged to indicate leading and trailing edge times.

The times recorded for the leading edge and for the trailing edge of a single ion arrival event are then preferably averaged and a count of 1 is preferably added to a histogram corresponding to this average arrival time. This procedure is preferably repeated for the next time of flight spectra until a complete histogrammed mass spectrum is produced.

In an embodiment the signal from an ion arrival may be passed to two separate TDCs or to a second input of a single TDC. The leading edge may be recorded using one TDC and the trailing edge recorded using another TDC or a second input of a single TDC. The two times may then be averaged and a count of 1 added to the histogram corresponding to this average time.

In an embodiment a first constant fraction discriminator may be used to detect the leading edge and a second constant fraction discriminator may be used to detect the trailing edge. The output from the discriminators may be recorded using one or more TDCs or a multiple input TDC.

In an embodiment the digital electronics within a TDC may be used to record a count of 1 in the histogram for all the time bins in which the input signal is above a pre-set threshold. For each ion arrival event a series of entries will be made in the histogram corresponding to the width of the arrival event above the pre-set threshold. Peaks in the final histogram comprised of a significant number of multiple ion arrivals will appear to be wider than those peaks with predominantly single ion arrivals. The error in mass to charge ratio assignment for the resultant histogrammed peaks will again be minimised.

In another less preferred embodiment this method may be applied to an Analogue to Digital (ADC) recording device. For an individual ion arrival event the point at which the leading and trailing edge of the signal crosses a predetermined threshold may be recorded using an ADC. In this case a weighted average arrival time within the time bins bounded by the leading and trailing edges detected may be calculated. The sum of the intensities of all the time bins bounded by the leading and trailing edge may also be recorded. A histogram may then be constructed consisting of events recorded at the average arrival time calculated with heights corresponding to the total intensity calculated for that event. For example, for times $t_1, t_2, \ldots t_n$ and associated intensities $i_1, i_2, \ldots i_n$ recorded above a pre-set intensity threshold for a single arrival event, the weight average T is given by:

$$T = \frac{\sum_{j=1}^{n} (t_j \times i_j)}{\sum_{j=1}^{n} i_j}$$

Although according to the preferred embodiment the intensity threshold for the leading and trailing edges preferably remains the same, according to a less preferred embodiment it is contemplated that the intensity threshold may vary, at least slightly, depending upon whether a leading edge or a trailing edge was being compared therewith.

According to the preferred embodiment the times for the ion signal to cross the intensity threshold for the leading and trailing edge are combined and then divided by two to produce an average (mean) value. However, according to less preferred embodiments the two different times may be combined and/or averaged in other ways. For example, one or both times may be weighted and some other average apart from the precise mean may be determined or approximated.

Although the present invention has been described with reference to preferred embodiments, it will be understood by those skilled in the art that various changes in form and detail may be made without departing from the scope of the invention as set forth in the accompanying claims.

The invention claimed is:

1. An ion detector for a mass spectrometer comprising:

a detector which generates, in use, a signal in response to one or more ions arriving at said detector;

means for determining a first time when a leading, rising, first or initial edge of said signal crosses or exceeds a first threshold or level;

means for determining a second time when a trailing, falling, second or subsequent edge of said signal crosses or falls below a second threshold or level; and means for combining or averaging only said first and second times to provide an ion arrival time.

2. An ion detector as claimed in claim 1, wherein said detector comprises a channel electron multiplier.

3. An ion detector as claimed in claim 1, wherein said detector comprises one or more microchannel plates.

4. An ion detector as claimed in claim 3, wherein said detector comprises at least two microchannel plates arranged to form at least one chevron pair of microchannel plates.

5. An ion detector as claimed in claim 3, wherein in use ions are received at an input surface of said one or more microchannel plates and electrons are released from an output surface of said one or more microchannel plates.

6. An ion detector as claimed in claim 5, further comprising one or more collection electrodes or anodes arranged to receive in use at least some of the electrons released from said one or more microchannel plates.

7. An ion detector as claimed in claim 1, wherein said detector comprises one or more discrete dynode electron multipliers.

8. An ion detector as claimed in 1, wherein said detector comprises a scintillator or phosphorous screen.

9. An ion detector as claimed in claim 8, wherein said detector further comprises a photo-multiplier.

10. An ion detector as claimed in claim 1, wherein said first threshold or level and/or said second threshold or level comprises an intensity threshold or level.

11. An ion detector as claimed in claim 1, wherein said first threshold or level is substantially the same as said second threshold or level.

12. An ion detector as claimed in claim 1, wherein said first threshold or level is substantially different to said second threshold or level.

13. An ion detector as claimed in claim 1, further comprising means for associating a leading, rising, first or initial edge of said signal with the closest detected trailing, falling, second or subsequent edge.

14. An ion detector as claimed in claim 1, wherein if said ion signal comprises multiple leading, rising, first or initial edges and/or multiple trailing, falling, second or subsequent edges then a said leading, rising, first or initial edge is associated with the trailing, falling, second or subsequent edge which is closest in time to said leading, rising, first or initial edge.

15. An ion detector as claimed in claim 1, further comprising a first Time to Digital Converter for determining said first time and/or said second time.

16. An ion detector as claimed in claim 15, further comprising a second Time to Digital Converter for determining said first time and/or said second time.

17. An ion detector as claimed in claim 15, wherein said first Time to Digital Converter and/or said second Time to Digital Converter is arranged to use leading edge discrimination to determine said first time and/or said second time.

18. An ion detector as claimed in claim 15, wherein said first Time to Digital Converter and/or said second Time to Digital Converter is arranged to use constant fraction discrimination to determine said first time and/or said second time.

19. An ion detector as claimed in claim 1, further comprising a first Analogue to Digital Converter for determining said first time and/or said second time.

20. An ion detector as claimed in claim 19, further comprising a second Analogue to Digital Converter for determining said first time and/or said second time.

21. A mass spectrometer comprising an ion detector as claimed in claim 1.

22. A mass spectrometer as claimed in claim 21, wherein said mass spectrometer comprises a Time of Flight mass spectrometer.

23. A mass spectrometer as claimed in claim 21, wherein said mass spectrometer is selected from the group consisting of: (i) a quadrupole mass analyser; (ii) a Penning mass analyser; (iii) a Fourier Transform Ion Cyclotron Resonance ("FTICR") mass analyser; (iv) a 2D or linear quadrupole ion trap; (v) a Paul or 3D quadrupole ion trap; and (vi) a magnetic sector mass analyser.

24. A mass spectrometer as claimed in claim 21, further comprising an ion source selected from the group consisting of: (i) an Electrospray Ionisation ("ESI") ion source; (ii) an Atmospheric Pressure Ionisation ("API") ion source; (iii) an Atmospheric Pressure Chemical Ionisation ("APCI") ion source; (iv) an Atmospheric Pressure Photo Ionisation ("APPI") ion source; (v) a Laser Desorption Ionisation ("LDI") ion source; (vi) an Inductively Coupled Plasma ("ICP") ion source; (vii) a Fast Atom Bombardment ("FAB") ion source; (viii) a Liquid Secondary Ion Mass Spectrometry ("LSIMS") ion source; (ix) a Field Ionisation ("FI") ion source; (x) a Field Desorption ("FD") ion source; (xi) an Electron Impact ("EI") ion source; (xii) a Chemical Ionisation ("CI") ion source; (xiii) a Matrix Assisted Laser Desorption Ionisation ("MALDI") ion source; and (xiv) a Desorption Ionisation on Silicon ("DIOS") ion source.

25. A mass spectrometer as claimed in claim 24, wherein said ion source is continuous or pulsed.

26. A method of determining the arrival time of one or more ions at a detector comprising:

generating a signal in response to one or more ions arriving at the detector;

determining a first time when a leading, rising, first or initial edge of said signal crosses or exceeds a first threshold or level;

determining a second time when a trailing, falling, second or subsequent edge of said signal crosses or falls below a second threshold or level; and combining or averaging only said first and second times to provide an ion arrival time.

27. The method of claim 26, wherein combining or averaging comprises adding the first and second times, and dividing the added first and second times by two.

28. The method of claim 26, wherein said first threshold or level and/or said second threshold or level comprises an intensity threshold or level.

29. The method of claim 26, wherein said first threshold or level is substantially the same as said second threshold or level.

30. The method of claim 26, wherein said first threshold or level is substantially different to said second threshold or level.

31. The method of claim 26, further comprising associating a leading, rising, first or initial edge of said signal with the closest detected trailing, falling, second or subsequent edge.

32. The method of claim 26, wherein if said ion signal comprises multiple leading, rising, first or initial edges and/or multiple trailing, falling, second or subsequent edges then a said leading, rising, first or initial edge is associated with the trailing, falling, second or subsequent edge which is closest in time to said leading, rising, first or initial edge.

* * * * *